US006672558B2

(12) United States Patent
Li

(10) Patent No.: US 6,672,558 B2
(45) Date of Patent: Jan. 6, 2004

(54) HOLDING APPARATUS FOR INFORMATION INPUT DEVICES

(75) Inventor: Chin-Cheng Li, Taipei (TW)

(73) Assignee: Darfon Electronics Corp., TaoYuan (TW)

( * ) Notice: Subject to any disclaimer, the term of this patent is extended or adjusted under 35 U.S.C. 154(b) by 15 days.

(21) Appl. No.: 09/929,120

(22) Filed: Aug. 15, 2001

(65) Prior Publication Data

US 2002/0020789 A1 Feb. 21, 2002

(30) Foreign Application Priority Data

Aug. 18, 2000 (TW) ...................................... 89214303 U

(51) Int. Cl.[7] .............................................. A47B 97/04
(52) U.S. Cl. ...................... 248/463; 248/439; 248/460; 248/917; 361/680; 361/683
(58) Field of Search ................................ 248/460, 463, 248/176.3, 439, 917, 351; 361/686, 683, 680

(56) References Cited

U.S. PATENT DOCUMENTS

| | | | | |
|---|---|---|---|---|
| 3,376,009 A | * | 4/1968 | Domino | 248/456 |
| 5,687,060 A | * | 11/1997 | Ruch et al. | 361/686 |
| 5,739,665 A | * | 4/1998 | Bares | 320/115 |
| 5,805,416 A | * | 9/1998 | Friend et al. | 361/686 |
| 5,875,094 A | * | 2/1999 | Kirkendoll | 361/686 |
| 6,042,414 A | * | 3/2000 | Kunert | 439/374 |
| 6,108,200 A | * | 8/2000 | Fullerton | 361/686 |
| 6,147,858 A | * | 11/2000 | Takahashi | 361/680 |
| 6,233,138 B1 | * | 5/2001 | Osgood | 361/681 |
| 6,246,577 B1 | * | 6/2001 | Han et al. | 361/686 |
| 6,282,088 B1 | * | 8/2001 | Canova et al. | 361/686 |
| 6,381,126 B1 | * | 4/2002 | Yoshimoto et al. | 361/683 |
| 6,381,128 B1 | * | 4/2002 | Kramer | 361/683 |

OTHER PUBLICATIONS

Web Publication, http://www.the-gadgeteer.com/stowaway-review. "The Stowaway Publication", dated Jan. 25, 2000.*

* cited by examiner

*Primary Examiner*—Leslie A. Braun
*Assistant Examiner*—Amy J. Sterling
(74) *Attorney, Agent, or Firm*—Troxell Law Office PLLC

(57) ABSTRACT

A holding apparatus engages with an information input device, particularly a foldable keyboard, for supporting portable electronic devices such as pocket PC, Palm PC, PDA, mobile phone and the like. The holding apparatus includes a receiving dock which has connector spindles pivotally engaged with the input device and a slot. A bracket is provided to slide in the slot at a first position to flatly fold on the input device to facilitate carrying when not in use. The bracket may be slid in the slot at a second position and be unfolded at a selected angle against the input device for the receiving dock to support the portable electronic device when in use.

6 Claims, 11 Drawing Sheets

HOLDING APPARATUS FOR INFORMATION INPUT DEVICES

FIELD OF THE INVENTION

This invention relates to a holding apparatus for information input devices and particularly for foldable input devices such as keyboards to support pocket personal computer (PC), palm PC, personal digital assistant (PDA), mobile phone and the like.

BACKGROUND OF THE INVENTION

A prolific of portable electronic devices have been introduced in the market place in recent years such as mobile phones, electronic game pad, PDA, Palm PC and the like. While they are convenient to carry and use in some selected function, they all have one big disadvantage, i.e. difficult to enter input data. One of the ways being suggested to resolve this problem is to attach an external keyboard. However conventional keyboards are rather bulky and not convenient to carry around. Hence foldable keyboard becomes an attractive alternative.

Conventional foldable keyboards usually engage with a holding means for supporting the portable electronic devices to be used. The holding means mostly engages with the keyboard by means of a complicated and costly fastening mechanism. The holding means generally has to fold flatly on the keyboard or other input devices to facilitate carrying when not in use, and unfold to a selected angle, usually vertical, against the electronic devices when in use. The vertical position is awkward to use. The bulged keyboard also is prone to subject accidental impact and may easily result in damage. The external wiring between the holding means and keyboard also is annoying and not convenient to carry and use. All this begs for improvement.

SUMMARY OF THE INVENTION

It is therefore an object of this invention to provide a holding apparatus for information input devices that has a connection socket for establishing electric connection with portable electronic devices without additional external wiring or connectors. The holding apparatus also may be positioned at various angles so that the electronic device held thereon may be viewed and used most comfortably to the users. It also provides storing function for protecting the bulged keys from undue impact or damage.

In one aspect, this invention includes a receiving dock engageable with the input device at a selected position and a bracket pivotally engaged with the receiving dock. The bracket may be flatly folded on the input device at a first position when not in use, and turned and unfolded at a second position for a selected angle for holding the electronic device when in use. The receiving dock has two connector spindles for pivotally engaging with the input device and a slot for holding the bracket.

In another aspect of this invention, a stand is provided for pivotally engaged with one end of the bracket for supporting the bracket at the selected angle desired at the second position, preferably less than 180 degree.

In a first embodiment of this invention, the receiving dock has an electronic connection socket for establishing electric connection with the portable electronic device and at least one bulged plane in the slot of the receiving dock for the bracket to slide thereon. The bracket is a hollow rectangular member having a pair of parallel side frames pivotally engageable with an elastic stand for holding the electronic device at a selected angle.

In a second embodiment of this invention, the receiving dock includes an electronic connection socket and a protrusive wedge member. The bracket is a solid rectangular member having a trough for the wedge member to slide therein at a selected distance and a pair of side slots engageable with an U-shaped elastic stand for holding the electronic device at a selected angle.

The third embodiment is largely constructed like the second embodiment but with the stand becomes a part of the bracket. The bracket and stand contact each other by a slant surface. A cavity is formed in the bracket and the stand across the slant surface and holds an elastic member therein. The stand may be swiveled against the bracket for a selected angle.

The fourth embodiment is largely constructed like the first embodiment, however the hollow bracket has two bores formed at two side frames pivotally engageable with a pair of stubs located in the receiving dock.

The fifth embodiment is largely constructed like the second embodiment. The bracket is also a solid rectangular member having two bores at two sides pivotally engageable with two stubs located in the receiving dock and two slide slots at two sides engageable with an U-shaped elastic stand. The stand has bulged bumps at inner sides for holding the bracket at a selected angle when in use. But there are no wedge member in the receiving dock and trough in the bracket.

The sixth embodiment is largely constructed like the third embodiment but without the wedge member in the receiving dock and the trough in the bracket and stand. The stand contacts with the bracket at a slant surface, and may be swiveled against the bracket at a selected angle.

BRIEF DESCRIPTION OF THE DRAWINGS

The invention, as well as its many advantages, may be further understood by the following detailed description and drawings, in which.

DETAILED DESCRIPTION OF THE PREFERRED EMBODIMENTS

Figure 1:
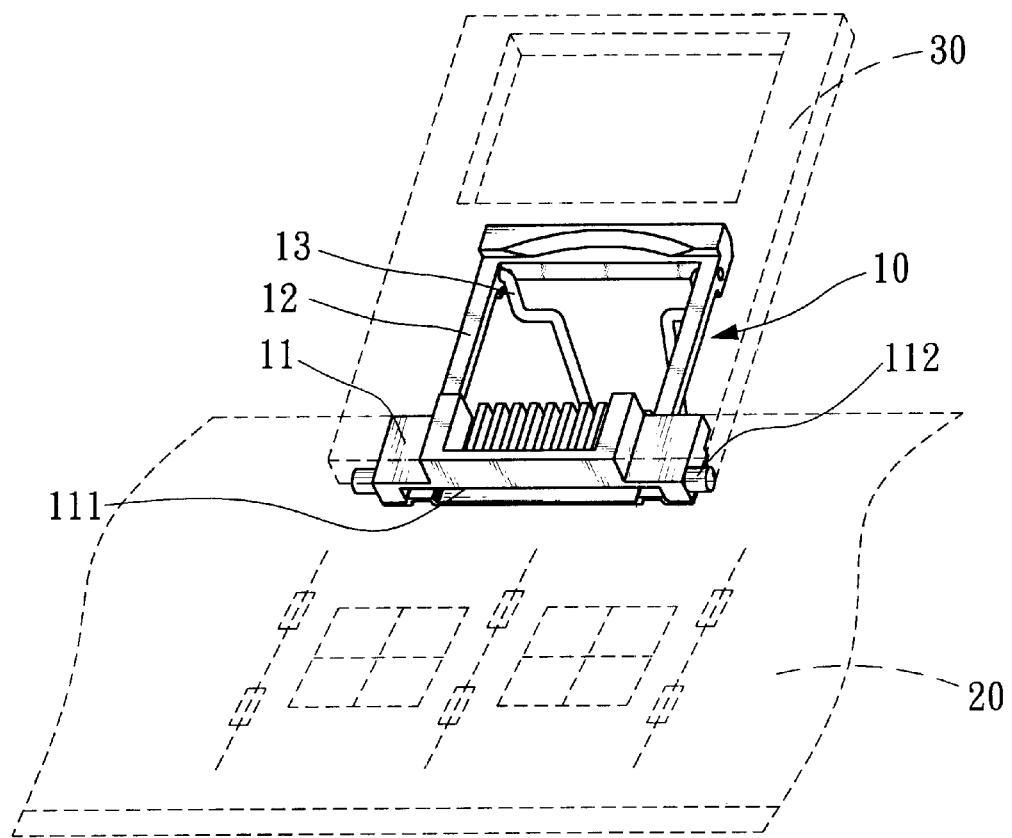
FIG. 1 is a perspective view of this invention holding a portable electronic device.

FIG. 1 shows a general structure of this invention. The holding apparatus 10 of this invention is engageable with an input device 20 for holding a portable electronic device 30 thereon. The input device 20 may be a keyboard, drawing table, scanner, pen based input device and the like. The portable electronic device 30 may be a mobile phone, game pad, PDA, Palm PC and the like.

The holding apparatus 10 includes a receiving dock 11 for holding the portable electronic device 30 and a bracket 12 mating with the receiving dock 11. The receiving dock 11 has a slot 111 to allow the bracket 12 to slide between a first position and a second position. The bracket 12 is folded into the input device 20 when the bracket 12 is positioned at the first position. When the bracket 12 is positioned at the second position, the potable electronic device 30 may be placed on the bracket 12.

The receiving dock 11 further has two connector spindles 112 at two sides thereof pivotally engageable with the input device 20 for providing angle exchange between receiving dock 11 and input device 20.

The holding apparatus 10 further comprises a stand 13 which is pivotally engaged with the bracket 12 and moved between a first position and a second position in a pivotally manner. When the stand 13 is at the first position, the stand 13 is substantially parallel to the bracket 12 in one side of the input device 20. When the stand 13 is at the second position, the stand 13 can be sliding and turning from first position to second position and raises the bracket 12. When the end of bracket 12 has been raised, the receiving dock 11 can be turned upward by the bracket 12 and keeps a selected angle with the input device 20. The angle is preferably less than 180 degree. The structure set forth above is generally applicable to the embodiments depicted in the following. Structural variance among different embodiments will be elaborated more detailed as follows.

Figure 2:
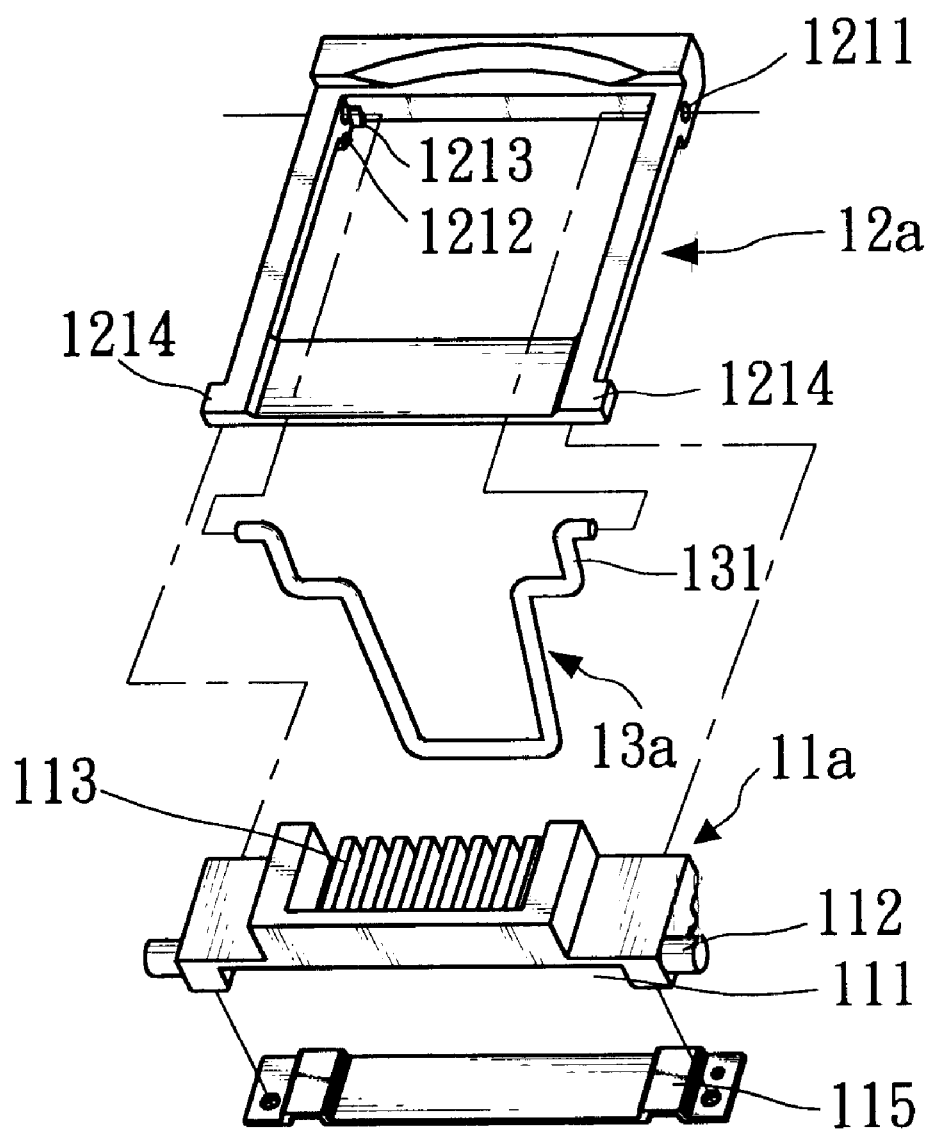
FIG. 2 is an exploded view of a first embodiment of this invention.
Figure 3A:
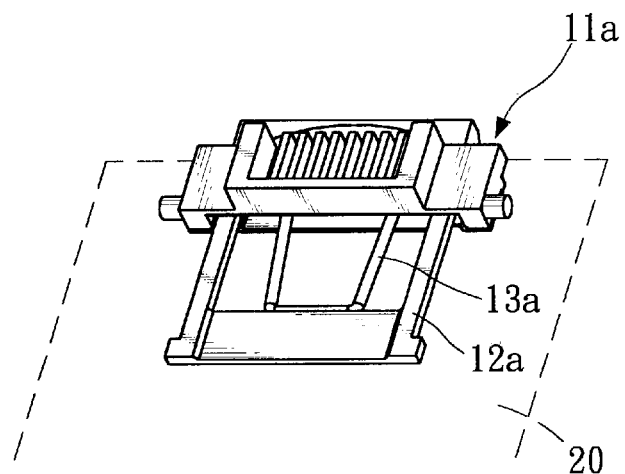
FIG. 3A is a perspective view of the first embodiment shown in FIG. 2, at a folding state.
Figure 3B:
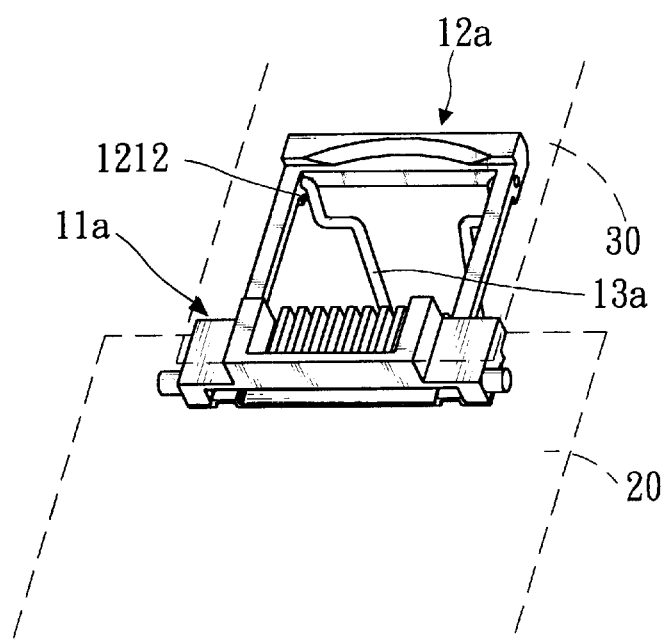
FIG. 3B is a perspective view of the first embodiment shown in FIG. 2, at an unfolding state.

Referring to FIGS. 2, 3A and 3B for the first embodiment of this invention, the receiving dock 11a includes a connection socket 113 which has contacts (shown by corrugated steps) for establishing electric connection with a portable electronic device (not shown in the figures).

At the lower portion of the receiving dock 11a, there is a recess with a strip member (unmarked) fixed at the bottom thereof. The strip member has two bulged planes 115 formed at two ends thereof. The strip member and bulged planes 115 form a slot 111 in the recess. At two outer sides of the receiving dock 11a, there are two connector spindles 112 pivotally engageable with the input device 20. The bracket 12a is a hollow rectangular member having a pair of parallel side frames (unmarked). At one end of the inner side of the parallel side frames, each side frame has an aperture 1211 formed therein, and a slant stub 1213 and a first lug 1212 spaced from the aperture 1211. At another end of the outer side, each side frame has a second lug 1214. There is a stand 13a made of an elastic bar which has two arms 131 each being pivotally engageable with the aperture 1211.

When the bracket 12a is at the first position, the bracket 12a and stand 13a are folded together and slipped through the slot 111 to lie on the input device 20 (shown in FIG. 3A). When in use, the bracket 12a is moved to the second position through the slot 111 (FIG. 3B). Then the bracket 12a and receiving dock 11a may be turned about the connector spindle 112 to a selected angle against the input device 20. The stand 13a then may be pivotally turned about the aperture 1211 until the arms 131 being held between the slant stub 1213 and first lug 1212. The bracket 12a and receiving dock 11a thus may be lifted and maintained at a selected angle against the input device 20. Then the portable electronic device 30 may be placed on the receiving dock 11a for use. The selected angle normally should be less than 180 degree, preferably between 30 and 80 degree. The second lug 1214 may hit two ends of the slot 111 for preventing the bracket 12a from disengaging with the docking socket 11a at the second position (FIG. 3B).

Figure 4:
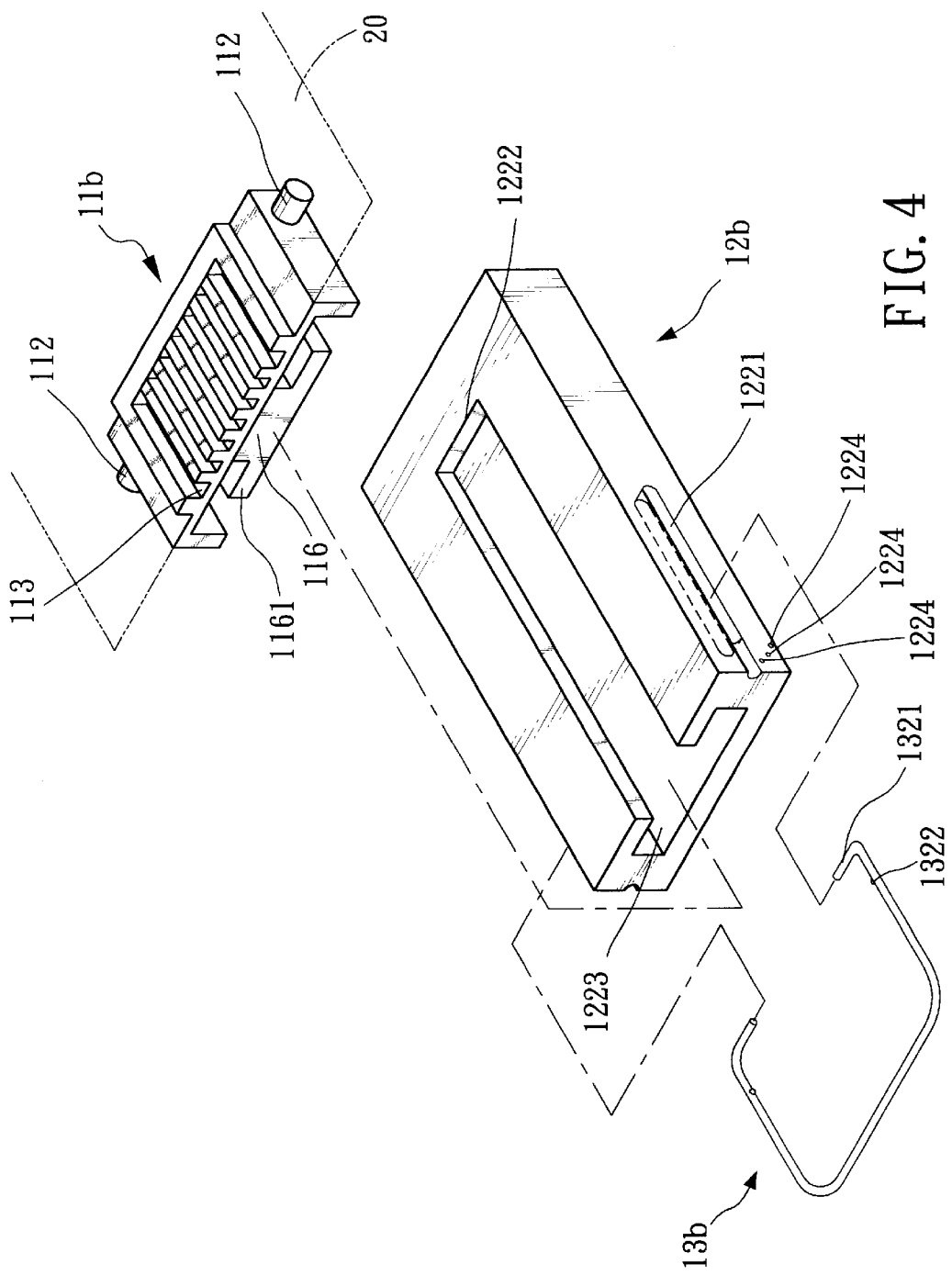
FIG. 4 is an exploded view of a second embodiment of this invention.
Figure 5:
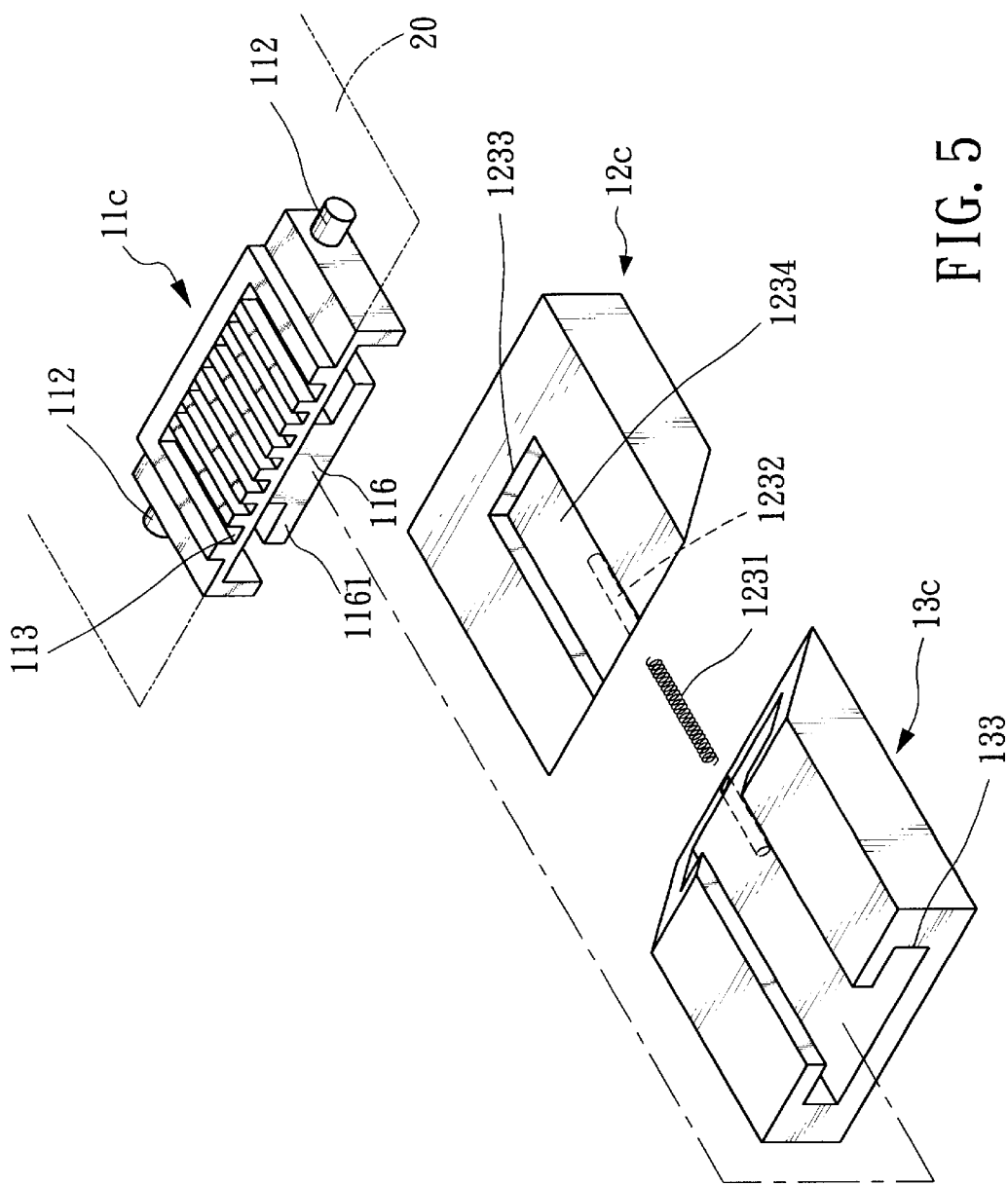
FIG. 5 is an exploded view of a third embodiment of this invention.

FIG. 4 shows a second embodiment of this invention. It also has a receiving dock 11b like the first embodiment, including a connection socket 113 and connector spindles 112.

However, at the bottom of the receiving dock 11b, there is a reversed T-shaped or trapezoid-shaped wedge member 116 for connecting with the bracket 12b. The wedge member 116 has two protrusive edges 1161 for preventing the bracket 12b separated from the receiving dock 11b. The bracket 12b has a trough 1223 which has one open end for the wedge member 116 to slide into the trough 1223 and a closed bordering edge 1222 to prevent the receiving dock 11b from disengaging with the bracket 12b. There are two slots 1221 which parallel with the trough 1223 formed on both outer sides of the bracket 12b respectively. There are a plurality of spaced dimple cavities 1224 formed at each side which adjacent to the end opening.

An U-shaped stand 13b made of an elastic bar has two fingers 1321 formed at two ends thereof pointing toward each other. There are two bulged bumps 1322 at two inner sides near the fingers 1321. The fingers 1321 are slidably engageable with the slots 1221. When the bracket 12b is at the first position, the stand 13b is longitudinally moved toward the bordering edge 1222 along the side slots 1221, and the bracket 12b is flatly folded into the input device (not shown in the figure). When the bracket 12b is pull out of the receiving dock 11b, the stand 13b is moved away from the bordering edge 1222 until the fingers 1321 reaching the end of the slots 1221 near the opening end. Then the stand 13b may be turned and lifted to make the bulged bumps 1322 engaged with one of the dimple cavities 1224. Thus the bracket 12b and the receiving dock 11b mounted thereon may be lifted at a selected angle against the input device for supporting a foldable electronic device.

FIGS. 5 and 6A through 6D show a third embodiment of this invention which is largely like the second embodiment shown in FIG. 4. The receiving dock 11c is essentially same as 11b in FIG. 4 with the components marked by same numerals.

The bracket 12c also has a trough 1234 for slidably connecting with the protrusive edges 1161 of the wedge member 116, a closed bordering end 1233 for preventing the bracket 12c separated from the dock 11c, and an opening end has a first slant surface with a cavity 1232 formed under the though 1234 for connecting with a elastic member 1231.

The stand 13c has a trough 133 same as the trough 1234 of the bracket 12c, a second slant surface mating with the first slant surface and a cavity formed corresponding the cavity 1232. The elastic member 1231 is located in the cavity 1232 to tie the bracket 12c and stand 13c together, then the trough 133 and the trough 1234 are slidably moved on the protrusive edge 1161 of the wedge member 116.

Figure 6A:
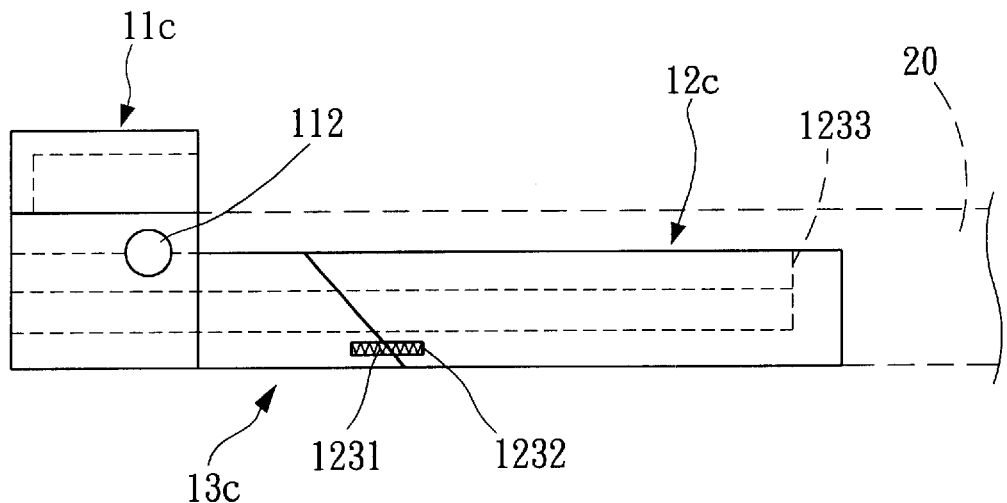
FIG. 6A is a side view of the third embodiment of this invention.
Figure 6B:
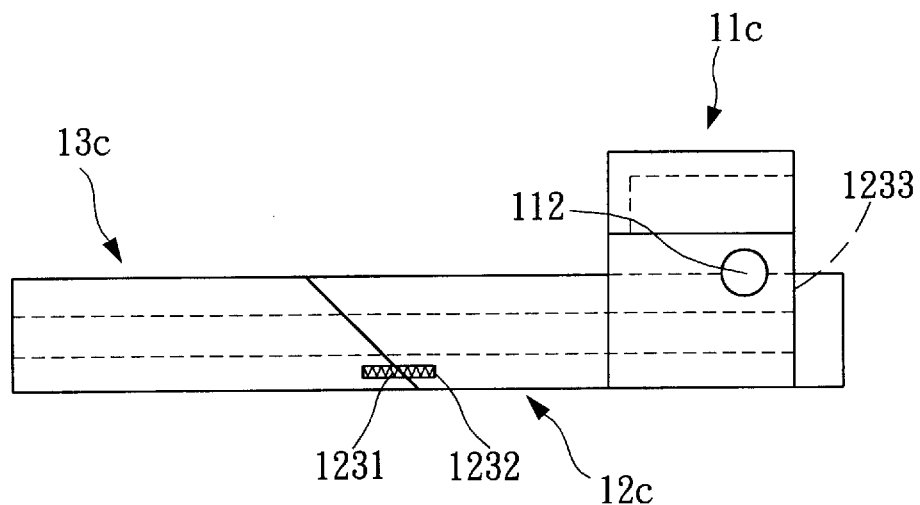
FIG. 6B is another side view of the third embodiment of this invention.
Figure 6C:
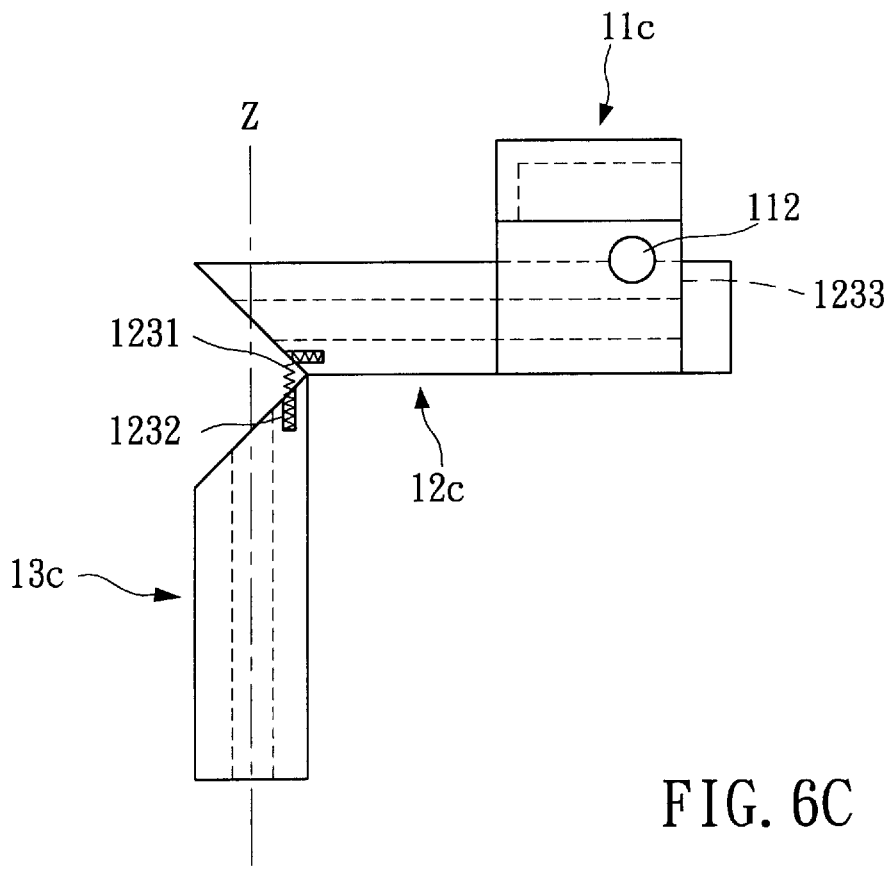
FIG. 6C is a side view of the third embodiment of this invention with the stand at a swiveling state.
Figure 6D:
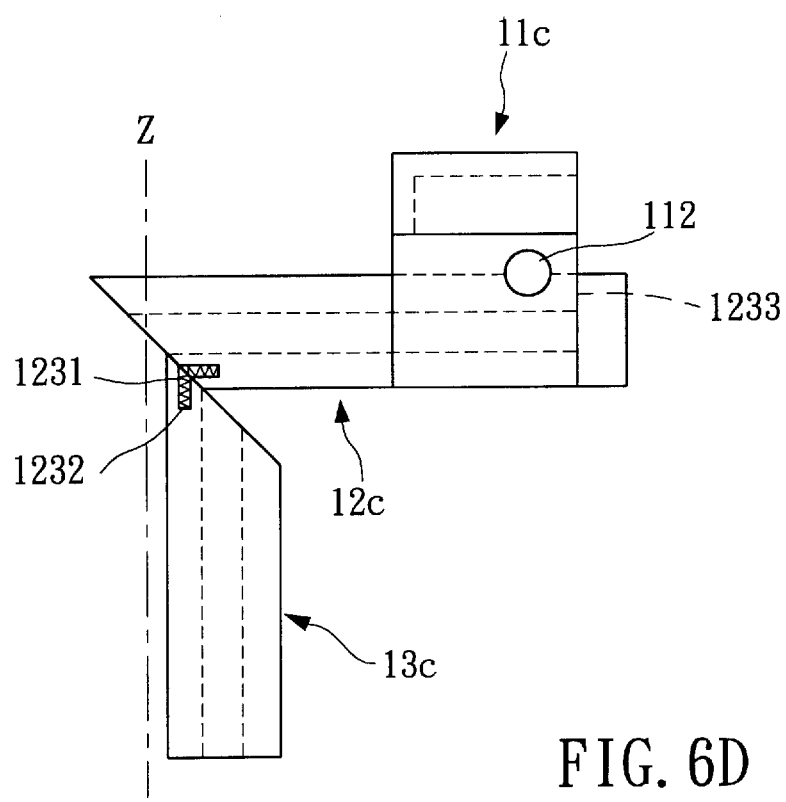
FIG. 6D is another side view of the third embodiment of this invention with the stand swiveled to a finished state.
Figure 6E:
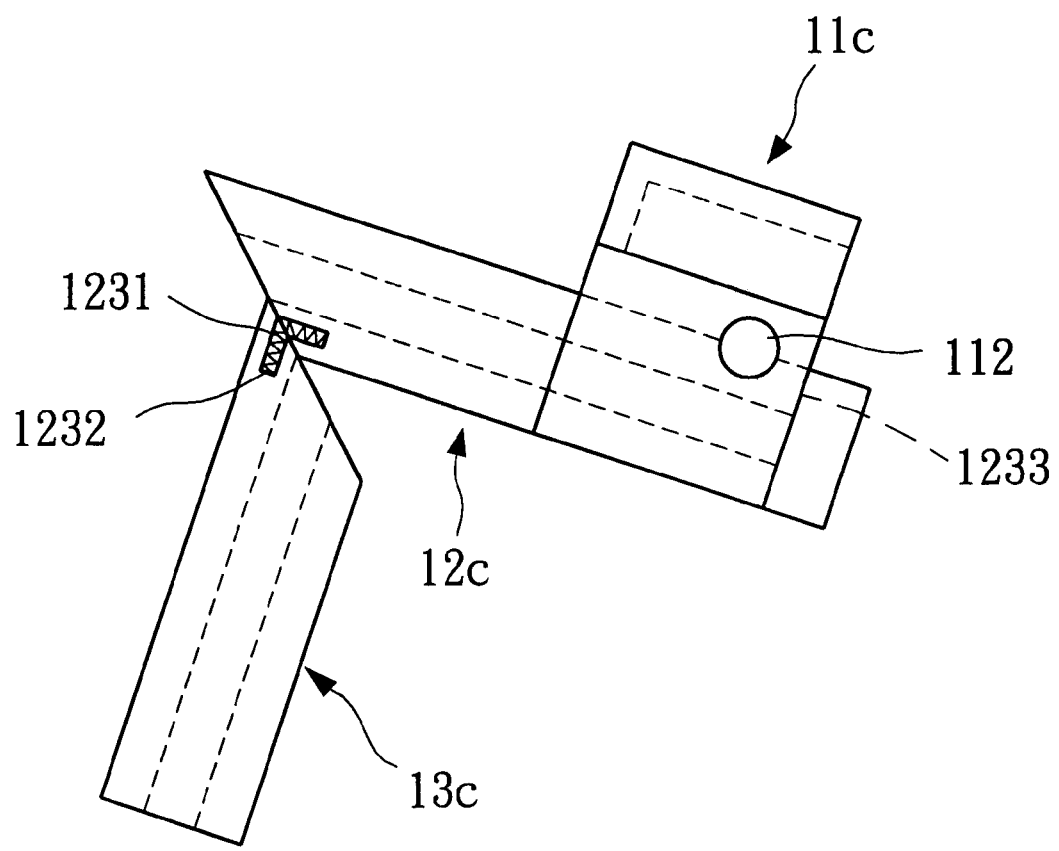
FIG. 6E is a side view of the third embodiment of this invention at an unfolded and used state.

The apparatus of this invention may be folded on the input device 20 at the first position when not in use (FIG. 6A). When the bracket 12c is positioned at the second position (FIG. 6B), the stand 13c can be pulled out and pivoted 90 degree by using the elastic member 1231 for forming a space with bracket 12c (FIG. 6C). Afterward, the stand 13c may be swiveled 180 degree about the Z-axis to make the slant surface of the stand 13c contact with the slant surface of the bracket 12c in opposite direction (FIG. 6D). Then the bracket 12c is lifting by the stand 13c, and receiving dock 11c is rotated by the connector spindle 112 for positioning at a selected angle (FIG. 6E).

In addition, the slot 111 can be replaced by a stub 114, and the bracket 12 is moved between a first position and a second position by the stubs 114.

Figure 7:
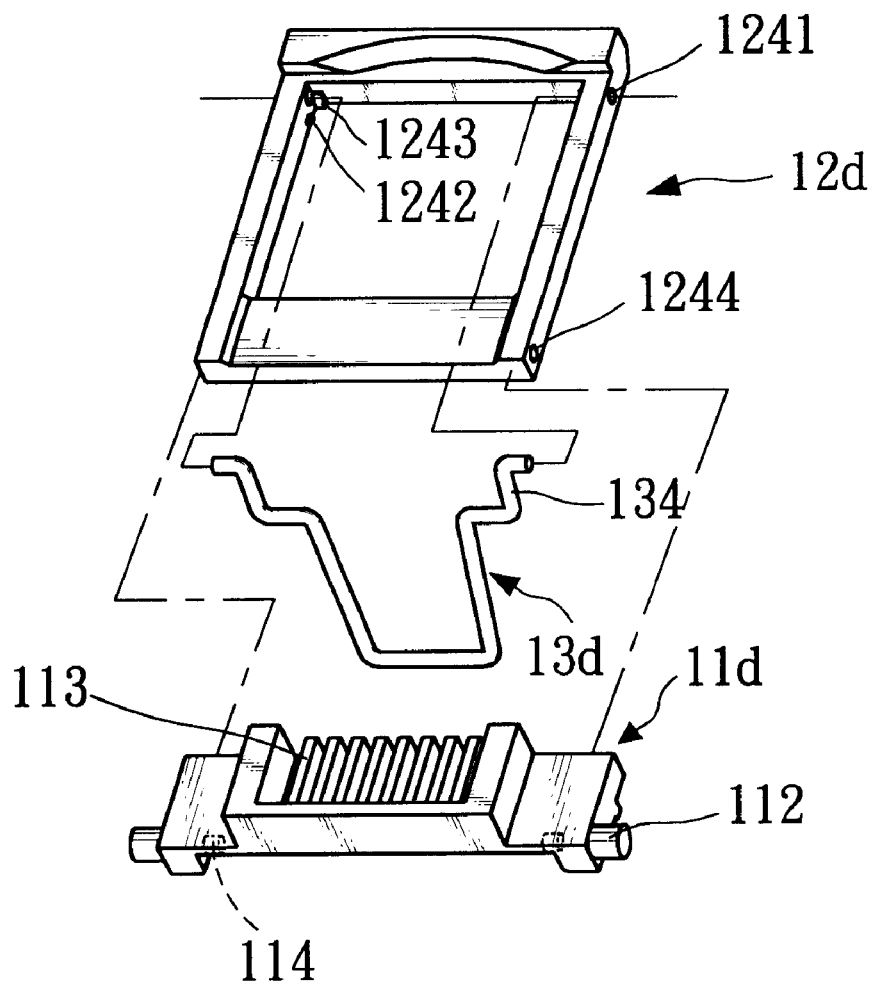
FIG. 7 is an exploded view of a fourth embodiment of this invention.

FIG. 7 shows a fourth embodiment of this invention. It is largely constructed like the first embodiment shown in FIG. 2. It also has a hollow rectangular bracket 12d with two parallel side frames having apertures 1241, slant stubs 1243 and first lugs 1242. However, instead of the second lugs at another end, there are bores 1244 formed at another end of the side frames of the bracket 12d. The receiving dock lid also has a connection socket 113 and connector spindles 112. However, the slot 111 is replaced by two stubs 114 which are pivotally engaged with the bores 1244. The stand 13d also has fingers 134 for pivotally engaging with he apertures 1241. It may function equally well as the first embodiment does. However, the bracket 12d is pivotally engaging with the receiving dock 11d through the bores 1244 and stubs 114 instead of sliding through the slot 111 when moving from the first position to the second position. Further details will be omitted here.

Figure 8:
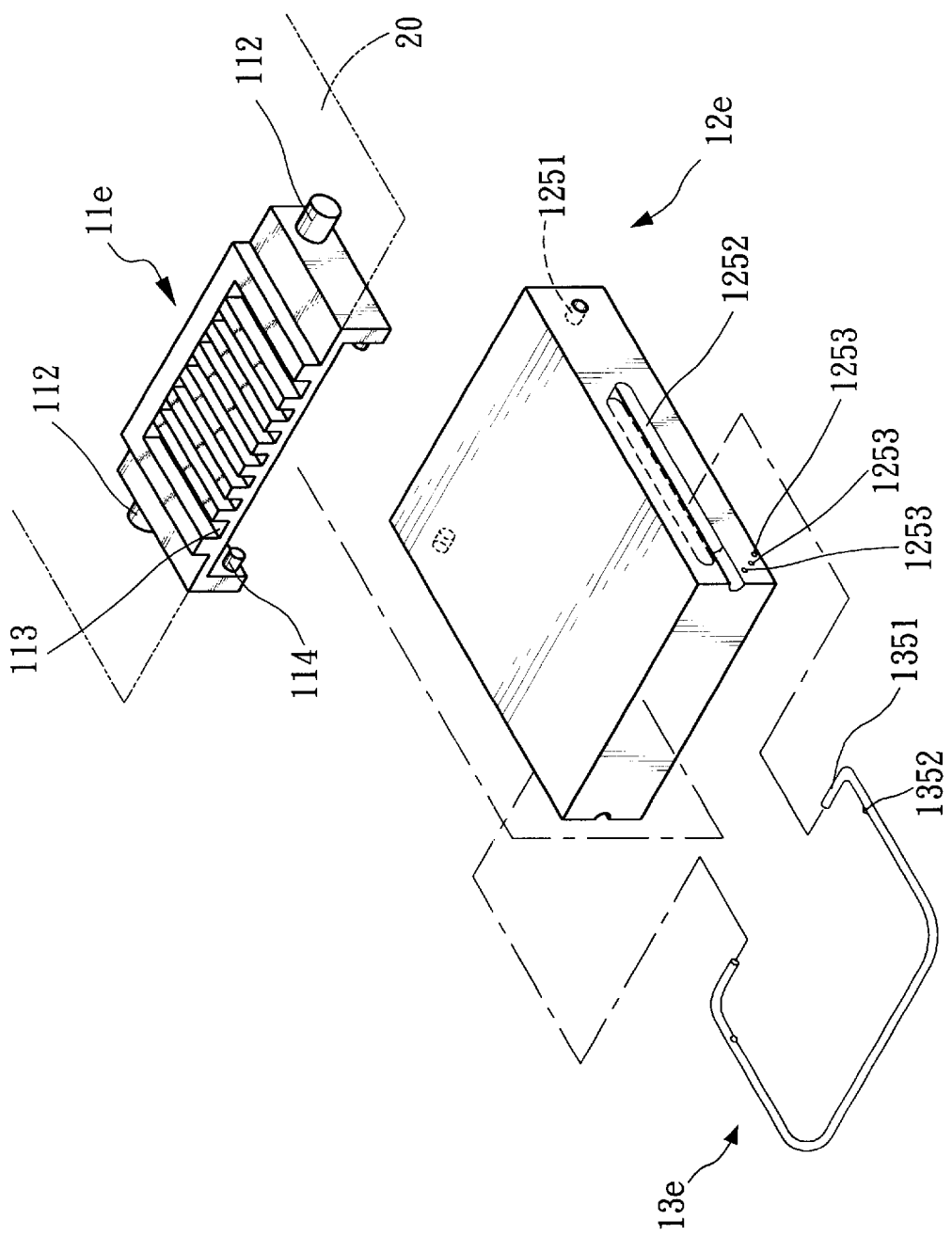
FIG. 8 is an exploded view of a fifth embodiment of this invention.

FIG. 8 shows a fifth embodiment of this invention. It is largely constructed like the second embodiment shown in FIG. 4. The receiving dock 11e also has a connection socket 113 and two connector spindles 112. The receiving dock 11e further has two opposite stubs 114 but without the wedge member. The bracket 12e is also a solid rectangular member including side slots 1252 and dimple cavities 1253, but has no trough. The bracket 12e further has two bores 1251 formed at one end at two sides engageable with the stubs 114. It also has a stand 13e with fingers 1351 and bulged bumps 1352. It may function equally well as the second embodiment. However, when the bracket 12e is at the second position, the stand 13e can raise the end of the bracket 12e by pivoting and adjusts angle between the stand 13e and the input device 20 by locking bulged bumps 1352 and dimple cavities 1253, so as to allow the receiving dock 11e to pivot around the connector spindle 112 for maintaining a proper angle.

Figure 9A:
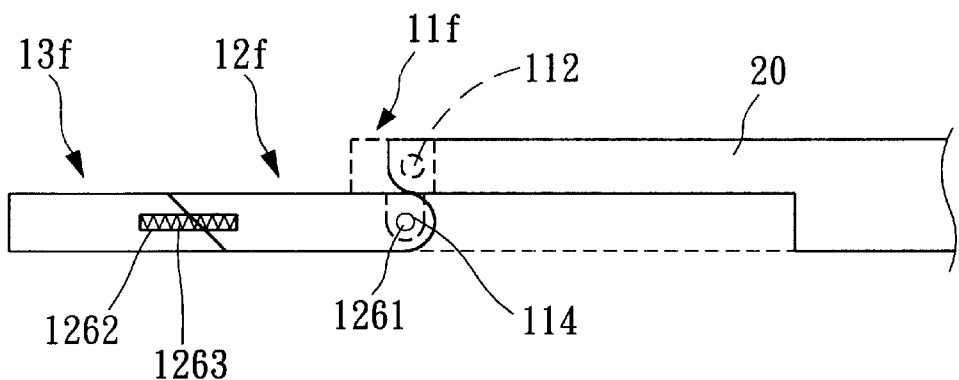
FIG. 9A is a side view of a six embodiment of this invention at a folding state.
Figure 9B:
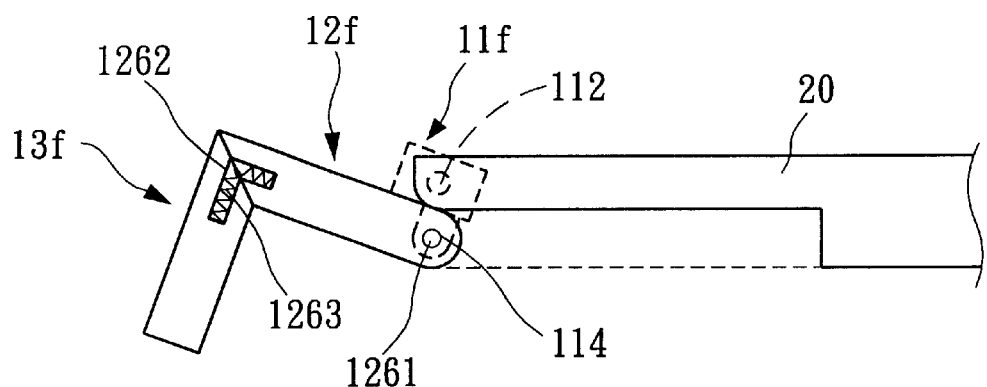
FIG. 9B is a side view of the six embodiment of this invention at an unfolding state.

FIGS. 9A and 9B show a sixth embodiment of this invention. It has a bracket 12f with a first slant surface and stand 13f with a second slant surface mating with the first slant surface like the ones in the third embodiment shown in FIG. 5, including a cavity 1262 and an elastic member 1263 across the contacted slant surfaces, but no trough. The receiving dock 11f has connector spindles 112 pivotally engageable with the input device 20 and stubs 114 pivotally engageable with the side bores 1261 of the bracket 12f, but no wedge member. When the bracket 12f is at the second position, as shown in FIG. 9A, the stand 13f can be pulled out and pivoted 90 degree by using the elastic member 1263 to form a space with bracket 12f, then pivoted 180 degree around the Z axis to make the first slant surface mating with the second slant surface, so as to allow the receiving dock 11f to pivot around the connector spindle 112 for maintaining a proper angle between the stand 13e and the input device 20.

Therefore, the bracket 12f is moved between the first position and the second position by the receiving dock 11f. When the bracket 12f is folded at the first position, the bracket 12f is received in one side of the input device 20, as the dotted line shown in FIG. 9A. When the bracket 12f is at the second position, the potable electronic device 30 may be placed on the bracket 12f.

It may thus be seen that the objects of the present invention set forth herein, as well as those made apparent from the foregoing description, are efficiently attained. While the preferred embodiments of the invention have been set forth for purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A holding apparatus for an information input device for supporting a portable electronic device, comprising:

a receiving dock located at a selected position on the information input device having at least a slot, the receiving dock having at least one bulged plane in the slot for a bracket to slide thereon; and a bracket engaged with the receiving dock and moved movable between a first position and a second position through the slot, wherein the bracket is received into the information input device when the bracket is positioned at the first position, and the bracket is used for supporting the portable electronic device when the bracket is at the second position.

2. The holding apparatus of claim 1, wherein the receiving dock comprises at least one connector spindle located at one side thereof for pivotally engaging the information input device to enable the receiving dock be positioned at a selected angle.

3. The holding apparatus of claim 1, wherein the receiving dock comprises a connection socket located at an upper portion thereof establishing electric connection with the portable electronic device.

4. The holding apparatus of claim 1, wherein the bracket is hollow rectangular member having a pair of substantially parallel side frames, each side frame has a pivotal aperture formed at an inside wall at one end thereof and a lug formed at an outside wall at another end thereof.

5. The holding apparatus of claim 2 further having a stand engaged with the bracket for pivotally lifting the bracket at the second position to enable the receiving dock to turn about a connector spindle for a selected angle against the information input device.

6. The holding apparatus of claim 5, wherein the stand comprises an elastic bar having two ends, wherein each end forms an arm engageable with the bracket.

* * * * *